F. LOWRY.

GREASE LUBRICATOR.

APPLICATION FILED APR. 27, 1909.

Reissued July 11, 1911.

13,270.

2 SHEETS—SHEET 1.

Witnesses;
Wm. R. Rhoads
Ruth A. Miller

Inventor;
Frank Lowry,
By Harry Grease
Attorney.

COLUMBIA PLANOGRAPH CO., WASHINGTON, D. C.

F. LOWRY.

GREASE LUBRICATOR.

APPLICATION FILED APR. 27, 1909.

Reissued July 11, 1911.

13,270.

2 SHEETS—SHEET 2.

Witnesses;

Wm. R. Rhoads.

Ruth C. Miller

Inventor;

Frank Lowry,

By Harry Grease.

Attorney.

COLUMBIA PLANOGRAPH CO., WASHINGTON, D. C.

UNITED STATES PATENT OFFICE.

FRANK LOWRY, OF STEUBENVILLE, OHIO, ASSIGNOR TO THE OHIO GREASE LUBRICANT COMPANY, A CORPORATION OF OHIO.

GREASE LUBRICATOR.

13,270. Specification of Reissued Letters Patent. Reissued July 11, 1911.

Original No. 803,297, dated October 31, 1905, Serial No. 266,956. Application for reissue filed April 27, 1909. Serial No. 492,608.

*To all whom it may concern:*

Be it known that I, FRANK LOWRY, a citizen of the United States, residing at Steubenville, in the county of Jefferson and State of Ohio, have invented certain new and useful Improvements in Grease Lubricators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new, novel, and useful improvement in that class of inventions known as "steam-actuated lubricating-cups" employing grease as a lubricant, being especially designed and intended to be connected with the steam-line supplying the steam-chest and valves on an engine.

Further, my device has for its object the combination and arrangement of parts whereby the grease contained in the reservoir will be kept in a liquid or workable state at all times and be prevented from freezing or thickening.

In the accompanying drawings, in two sheets, forming a part of this specification, I have illustrated my invention by several views, in which—

Figure 1:
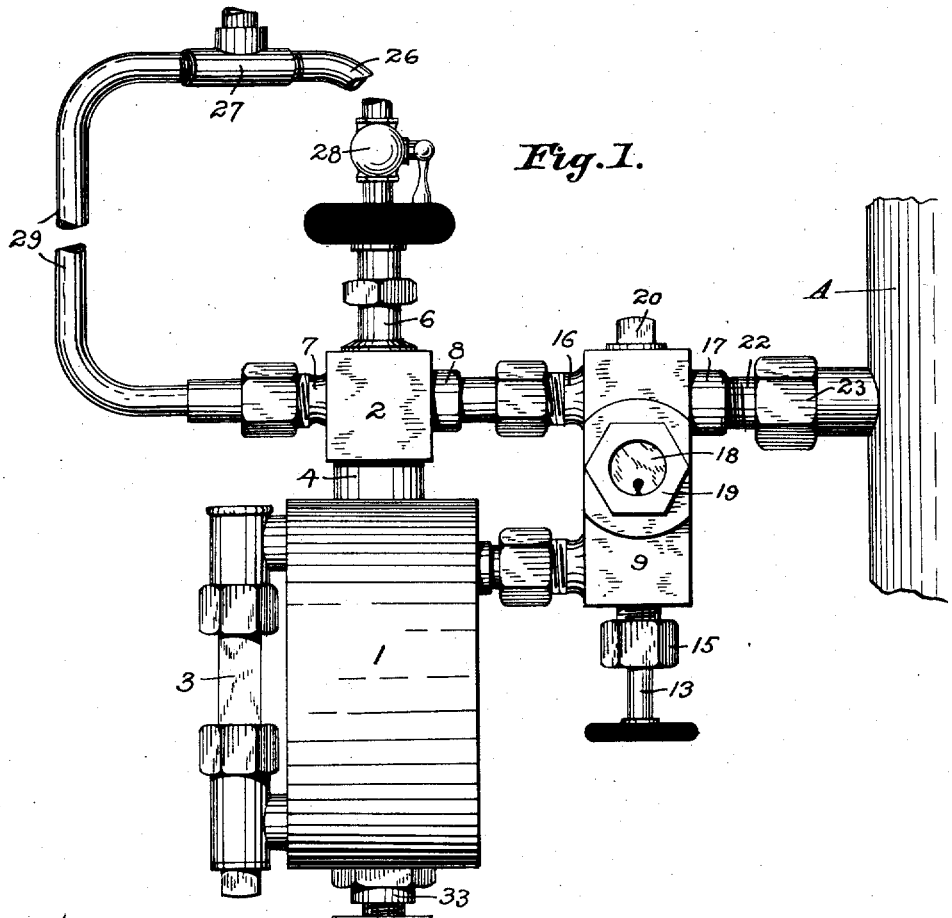
Figure 2:
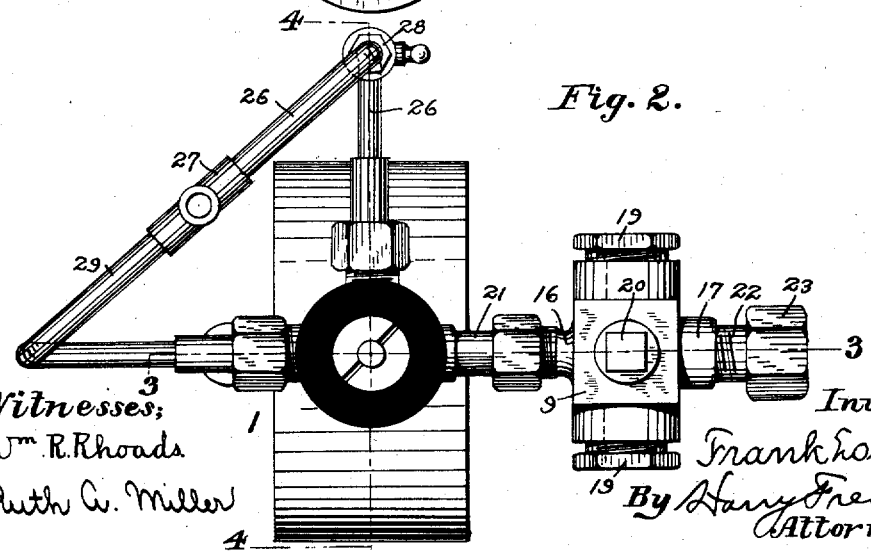
Figure 3:
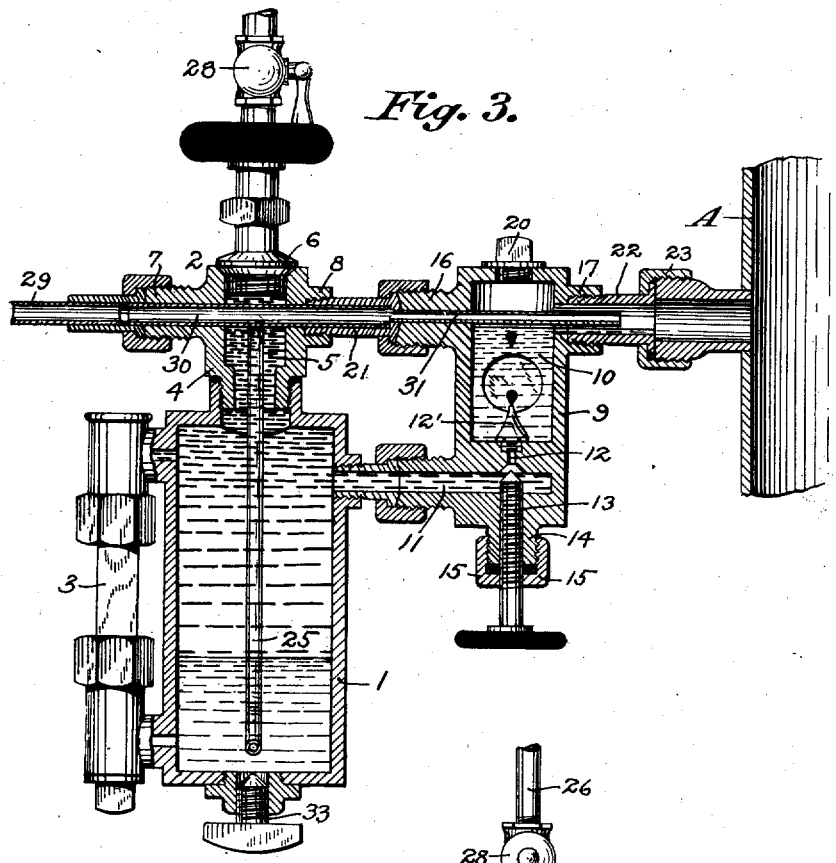
Figure 4:
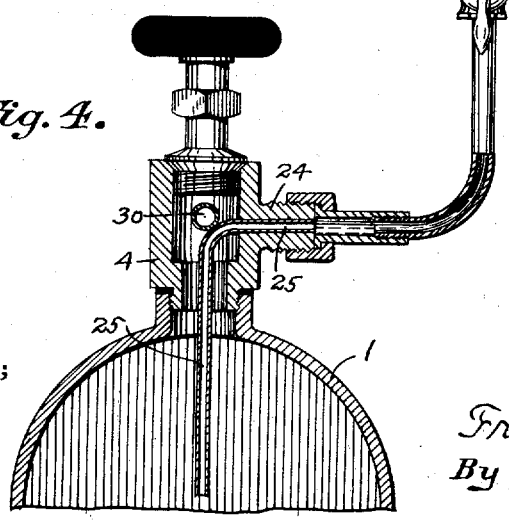
Figure 5:
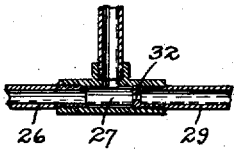

Figure 1, Sheet 1, is a front elevation of the reservoir and head portion. Fig. 2 is a top plan view of the same. Fig. 3, Sheet 2, is a front elevation showing the head and reservoir portion in section. Fig 4 is a sectional view of the valved condensing means communicating with the head and reservoir. Fig. 5 is a three-way connection uniting the heating and condensing pipes with the steam-pipe leading to the steam-line.

Numerals of reference designate like parts throughout the different views, in which the numeral 1 represents the reservoir portion of my device, 2 a removable head attached to the same, and 3 an index-glass arranged on the side of said reservoir.

Arranged in the body portion 4 of the head is a chamber 5, through the top of which is inserted a filling-plug 6. Formed on the body portion 4 are the bosses 7 and 8. Connected to the side of the reservoir near the top is a member 9, having a collecting-chamber 10 formed therein, and a passage-way 11, communicating with the interior of the reservoir. Connecting said chamber 10 and the passage-way 11 is a port 12, which affords a seat for the screw-valve stem 13, entering the member 9 through a boss 14, and a packing-nut 15. Over this port 12 is seated a nipple 12′. Formed on both sides of the member 9 near the top are the bosses 16 and 17, the latter having a central opening therethrough which communicates with the chamber 10 and a feed-pipe 22 leading to the steam-line. Arranged on both sides of the member 9 are sight-glasses 18 18, held in suitable pockets and secured in position by jam-nuts 19, through each of which may be observed the action of the oil through the sight-feed line thus formed. A screw-plug 20 affords a means of getting at the interior of the chamber 10 for the purpose of removing the nipple 12′ or for cleaning the interior of said chamber. Connecting the bosses 8 and 16 is a coupling tube 21, one end thereof being a male connection which screws into the boss 8, while the opposite end is joined to the boss 16 by a union. Connected to the boss 17 is a feed-pipe 22, which communicates with the chamber 10 and is designed to be connected by a union 23 with the steam-line leading to the engine. Entering the chamber 5 through a boss 24, formed in the rear wall of the portion 4, is a condensing-tube 25, which passes on down through the head and reservoir portions nearly to the bottom of the latter. The upper end of this tube is in communication with a pipe 26, leading to a three-way connection 27, and from that point with a pipe designed to connect with the steam-line above, there being a valve 28 located in some convenient part of the pipe 26. Passing downward from the three-way connection 27 is a heating-pipe 29, the lower end being joined with the boss 7 by a union and connected with a heating-tube 30, extending directly through the chamber 5. A reduced tube 31 communicates with the tube 30 and extends through the chamber 10 into the feed-pipe 22. The inturned annular flange 32 is provided in the end of the pipe 29 where it joins the three-way connection 27, which flange serves to obstruct the passage of steam through said pipe. A drain-valve 33 is provided in the bottom of the reservoir portion.

In the operation of my lubricating device the cup is placed at any suitable location near the engine, the coupling 22 being connected with the steam-line supplying the steam-chest and valves on the engine and the three-way connection with a pipe leading to the steam-line at any convenient point above. The reservoir is then filled with grease through the plug 6, and the cup is ready for service. By opening the valve 28 steam will be admitted into the reservoir through the pipe 25, and by coming in contact with the body of grease contained in the cup this steam will condense and be deposited in the bottom of the reservoir, gradually filling the tube 25. The weight of this condensation over and above the boiler-pressure will lift the body of grease and keep it in the upper portion of the reservoir and filling the chamber 5, where it will come in contact with the heating-tube 30 and be reduced to a workable state, being kept in this condition as long as steam is introduced through the heating pipe. By opening the valve 13 the liquid grease will appear at the nipple 12′, where it will take the form of a drop and by its own buoyance and the hydrostatic pressure in the reservoir keeping the passage-way 11 filled will pass upward through the body of water contained in chamber 10. On reaching the surface of the water in the top of the chamber, the drops of grease will be drawn through the feed-pipe 22 by the suction of the steam from the tube 31 and from there conveyed to the engine. It being essential that the cup should not get too hot, and thus scorch the grease and by so doing destroy the lubricating properties of the same, I have provided a means whereby the flow of steam is obstructed before passing through the heating-pipe, thus keeping the cup at an even and moderate temperature sufficient to reduce the grease to a workable state at all times. This method consists in forming a constricted opening in the pipe 29 where it connects with the three-way joint 27. I consider this method preferable to placing a valve in the heating pipe, as it does not need watching nor is there any danger of it getting out of order and then cause the cup to become too hot. It also does away with the extra expense of a valve connection. The tube 31 extending through the chamber 10 is made slightly smaller than the communicating tube 30 for the purpose of holding back the heat in said tube 30 and also for the purpose of causing an increased velocity through the tube 31 in order to provide a sufficient suction to draw the particles of grease from the chamber 10 into the steam-line. The action of the grease can readily be seen through the sight-glasses 18 18, arranged at each side of the member 9. These glasses are flat, of a suitable thickness for convenience and cheapness, are cut square in order to fit into suitable pockets, and are held in position by the hollow jam-nuts 19.

Having thus fully shown and described my invention, what I claim, and desire to secure by Letters Patent, is—

1. In a grease lubricating device, the combination with a reservoir, a hollow removable head, and a collecting-chamber connected with the reservoir and steam-line leading to the engine, of a valve-regulated condensing means adapted to connect with the steam-line above the collecting-chamber connection, passing down through the head and reservoir portions nearly to the bottom of the latter; a heating-pipe passing through the chamber formed in the head portion, a pipe leading to the steam-line, one end of the heating-pipe being in communication with the last-named pipe and the other end communicating with a reduced pipe extending through the collecting-chamber; and means for limiting the amount of steam through the heating-pipe; as, and for, the purpose set forth.

2. In a grease lubricating device, the combination with a reservoir, a hollow removable head, and a collecting-chamber connected with the reservoir and steam-line leading to the engine, of a valve-regulated condensing means adapted to connect with the steam-line above the collecting-chamber connection, passing down through the head and reservoir portions nearly to the bottom of the latter, and a heating-pipe adapted to connect with the steam-line above and extending through the head-chamber and also through the collecting-chamber.

3. In combination, a reservoir, a collecting-chamber in communication with the reservoir, a steam-supply line in communication with the collecting-chamber, and a heating-pipe communicating with the supply-line above the collecting-chamber and passing through the reservoir and the cavity of the collecting-chamber, the portion of the pipe passing through the collecting-chamber being reduced with relation to the remainder of the pipe.

4. In combination, a steam-supply line, a lubricator including a reservoir and a communicating collecting-chamber, a feed-pipe connecting the chamber with the supply-line, a condensing-pipe connected with the supply-line and terminating near the bottom of the reservoir, and a heating-pipe connected to the supply-line and passing through the reservoir and the cavity of the collecting-chamber and into the feed-pipe.

5. In combination, a reservoir, a collecting-chamber in communication with the reservoir, a steam-supply line in connection with the collecting-chamber, and a heating-pipe communicating with the supply-line and passing through the reservoir and the cavity of the collecting-chamber, the bore of the heating-pipe being obstructed before passing through the reservoir and the portion in the collecting-chamber being reduced with relation to the remainder of the pipe.

6. In combination, a steam-supply line, a lubricator including a reservoir and a communicating collecting-chamber, a feed-pipe connecting the chamber with the supply-line, and a heating-pipe connected to the supply-line and passing through the cavities of the reservoir and collecting-chamber into the feed-pipe.

7. In combination, a steam-supply line, a lubricator including a reservoir and a communicating collecting-chamber, a feed-pipe connecting the chamber with the supply-line, and a heating-pipe connected to the supply-line and passing through the reservoir and the cavity of the collecting-chamber into the feed-pipe.

8. In combination, a steam-supply line, a lubricator including a reservoir and a communicating collecting-chamber, a feed-pipe connecting the chamber with the supply-line, and a steam-pipe passing through the cavity of the collecting-chamber into the feed-pipe.

FRANK LOWRY.

Witnesses:
WM. R. RHOADS,
RUTH A. MILLER.

Copies of this patent may be obtained for five cents each, by addressing the "Commissioner of Patents, Washington, D. C."